United States Patent
Pascal et al.

(10) Patent No.: US 9,427,661 B1
(45) Date of Patent: Aug. 30, 2016

(54) SOCIAL NETWORKING GAME WITH INTEGRATED SOCIAL GRAPH

(71) Applicants: Andrew Pascal, Las Vegas, NV (US); Paul Mathews, Las Vegas, NV (US); Monty Kerr, Austin, TX (US)

(72) Inventors: Andrew Pascal, Las Vegas, NV (US); Paul Mathews, Las Vegas, NV (US); Monty Kerr, Austin, TX (US)

(73) Assignee: Playstudios, Inc., Las Vegas, NV (US)

( * ) Notice: Subject to any disclaimer, the term of this patent is extended or adjusted under 35 U.S.C. 154(b) by 0 days.

(21) Appl. No.: 13/786,340

(22) Filed: Mar. 5, 2013

Related U.S. Application Data (60) Provisional application No. 61/606,950, filed on Mar. 5, 2012.

(51) Int. Cl.
*A63F 9/24* (2006.01)
*A63F 13/30* (2014.01)

(52) U.S. Cl.
CPC .......... *A63F 13/12* (2013.01); *A63F 2300/306* (2013.01); *A63F 2300/402* (2013.01); *A63F 2300/403* (2013.01); *A63F 2300/535* (2013.01); *A63F 2300/537* (2013.01); *A63F 2300/572* (2013.01)

(58) Field of Classification Search
USPC ............. 345/473; 463/30, 42; 709/217, 758; 715/745, 757-758
See application file for complete search history.

(56) References Cited

U.S. PATENT DOCUMENTS

| | | | | |
|---|---|---|---|---|
| 6,772,195 | B1* | 8/2004 | Hatlelid et al. | 709/204 |
| 7,386,799 | B1* | 6/2008 | Clanton et al. | 715/758 |
| 7,468,729 | B1* | 12/2008 | Levinson | 345/473 |
| 8,739,037 | B1* | 5/2014 | Hoffman et al. | 715/706 |
| 2008/0215994 | A1* | 9/2008 | Harrison | A63F 13/10 715/757 |
| 2009/0013059 | A1* | 1/2009 | Partaker et al. | 709/217 |
| 2009/0055754 | A1* | 2/2009 | Finn et al. | 715/757 |
| 2009/0235184 | A1* | 9/2009 | Perlson et al. | 715/758 |
| 2009/0239666 | A1* | 9/2009 | Hall et al. | 463/42 |
| 2010/0050088 | A1* | 2/2010 | Neustaedter et al. | 715/745 |
| 2011/0202605 | A1* | 8/2011 | Shochet et al. | 709/205 |
| 2012/0071244 | A1* | 3/2012 | Gillo | A63F 13/00 463/42 |
| 2012/0131478 | A1* | 5/2012 | Maor et al. | 715/757 |
| 2012/0215844 | A1* | 8/2012 | Ferlez et al. | 709/204 |
| 2013/0130762 | A1* | 5/2013 | John et al. | 463/9 |
| 2013/0151603 | A1* | 6/2013 | Lobb | A63F 13/12 709/204 |
| 2013/0178281 | A1* | 7/2013 | Ayyar et al. | 463/30 |

OTHER PUBLICATIONS

Carrie Lynn, Virtual Worlds on Facebook, Jan. 27, 2010, http://worlds.ruc.dk/archives/1946.*

Rand Linden, Second Life Quickstart, Dec. 22, 2011, http://community.secondlife.com/t5/English-Knowledge-Base/Second-Life-Quickstart/ta-p/1087919.*

* cited by examiner

*Primary Examiner* — Jason Yen
(74) *Attorney, Agent, or Firm* — Muskin & Farmer LLC (57) ABSTRACT

A method, apparatus, and computer readable storage to implement a social networking game that allows a player to interact in a virtual world. The virtual world displays characters representing the player's friends on the social networking site. The player's friends are automatically imported into the game along with some of their real world characteristics.

16 Claims, 5 Drawing Sheets

SOCIAL NETWORKING GAME WITH INTEGRATED SOCIAL GRAPH

CROSS REFERENCE TO RELATED APPLICATIONS

This application claims benefit to U.S. provisional application 61/606,950, filed on Mar. 5, 2012, entitled, "Social Networking Game with Integrated Social Graph", which is incorporated by reference herein in its entirety.

BACKGROUND OF THE INVENTION

1. Field of the Invention

The present general inventive concept is directed to a method, apparatus, and computer readable storage medium directed to a game that can be played on social networking sites, whether accessed via the internet or through mobile devices/channels, that provides players opportunities to see characters inside the game that are taken from the player's social graph.

2. Description of the Related Art

"City building" games (e.g., SIM-CITY) allow players to construct virtual cities. Players can place virtual buildings and set virtual parameters (e.g., virtual wages, etc.) in order to "rule" the virtual city. The virtual city can have virtual inhabitants, which can walk around the virtual city. The virtual inhabitants in SIM-CITY appear to be generated randomly with random attributes.

What is needed is a city building game that integrates a player's real world friends into the virtual city.

SUMMARY OF THE INVENTION

It is an aspect of the present invention to provide a game that integrates a player's real world friends into the game.

The above aspect can be obtained by a method that includes (a) enabling a player to sign into a game associated with a social networking site; (b) retrieving, from the social networking site, a friend of the player and the friend's respective friend information; and (c) displaying a game area depicted in two or three dimensions which comprises a virtual friend walking around the game area, the virtual friend having characteristics based on the friend information.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Reference will now be made in detail to the presently preferred embodiments of the invention, examples of which are illustrated in the accompanying drawings, wherein like reference numerals refer to like elements throughout.

The present inventive concept relates to a game that can be played on a social networking site such as FACEBOOK (including what is described in U.S. Pat. No. 7,669,123 which is incorporated by reference herein in its entirety), MYSPACE, or any other site which maintains a database of users and provides an interface for interaction.

The inventive concept enables a player to play a graphical game that can be played on a social networking site which allows a player to construct structures and interact in a virtual world, and the virtual world includes the player's friends from the social networking site. Friends (commonly known in the art on sites such as FACEBOOK) are pairs of users who mutually agree to associate with each other. The virtual world (also referred to herein as playing world, playing area, virtual city, etc.) is automatically populated with virtual friends, the virtual friends corresponding the player's friends on the social networking site. The virtual friends can take on the appearance and characteristics of their real world counterparts. The player can also initiate a communication inside the game with the virtual friends which can be delivered (or have some type of effect) outside of the game.

Figure 1:
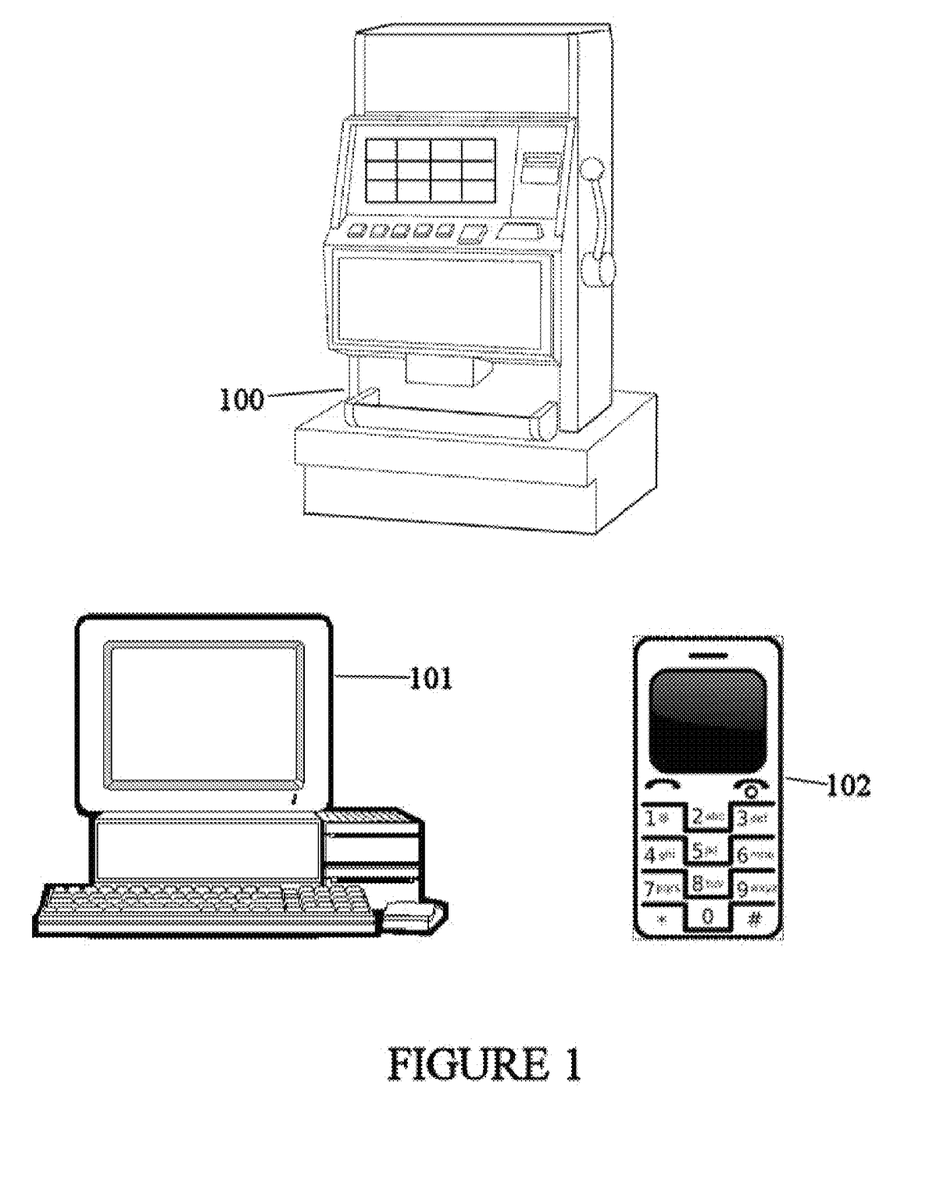
FIG. 1 is a drawing illustrating numerous apparatuses that can play the game described herein, according to an embodiment.

FIG. 1 is a drawing illustrating numerous apparatuses that can play the slot machine game described herein, according to an embodiment.

The game described herein can be played on an electronic gaming machine 100 that can found in brick and mortar casinos or other venues such as internet cafes, etc. Cash (or cashless vouchers) can be inserted into the machine 100 using a bill acceptor which credits the machine with a respective amount of credits which can then be used to play the game, and winnings are paid out in the form of credits which can then be cashed out for cash or a cashless voucher that can be redeemed for cash. The game described herein can exist on a software module pre-installed on the slot machine 100 or can be downloaded to the electronic gaming machine 100 from a central remote server.

The game described herein can also be played on a computer 101 such as a personal computer, laptop, etc. The game can be downloaded to the computer 101 and stored locally on the computer 101. Alternatively, the computer 101 can have an internet connection (not illustrated) so that the game can be served from a remote location and player and displayed on the computer 101. For example, the game can be played on an online casino (wherein the player can wager for real money using a credit card or other deposit method, where legal) in which the results are determined on a remote server and transmitted to the computer 101 so that the computer displays the results. The game can also be played on the computer 101 for "casual play" on a social networking site (e.g., FACEBOOK, MYSPACE, etc.) wherein the game software can be launched from within the social network site itself "Casual play" is where the game can be played not for real money but for credits which typically have no cash value, but can have other benefits to the player.

The game described herein can also be played on a cell phone 102 or any other type of portable device, such as a tablet computer, etc. The portable device can implement any of the paradigms described above with respect to the computer 101 (e.g., online casino, social networking site, etc.)

Figure 2:
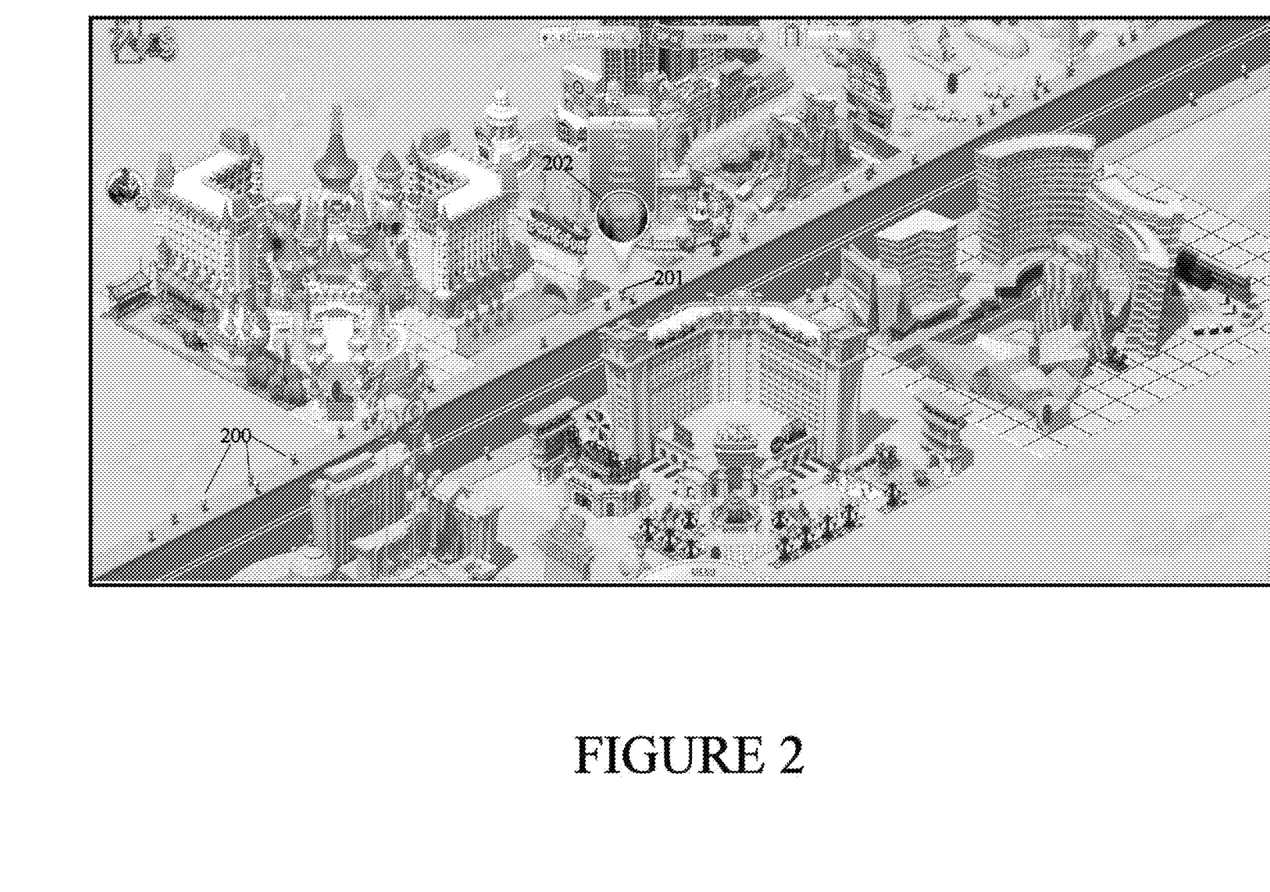
FIG. 2 is a sample screen shot illustrating a social networking game which an integrate social graph, according to an embodiment.

FIG. 2 is a sample screen shot illustrating a social networking game which an integrated social graph, according to an embodiment.

Shown is the playing area (playing area, playing world, virtual city, etc.) which depicts buildings and virtual friends 200. There is no limit to the number of virtual friends that would appear walking around in the playing world. The buildings can be placed by the player as the game progresses. The virtual friends 200 are depicted walking around the playing area, entering and leaving buildings, etc. The virtual friends 200 "live" in the playing area and have an effect on the gameplay. For example, if the player owns a casino in the paying area, the virtual friends 200 can enter the casino, play and lose money, of which the player's game credits would reflect "winning" this money from the virtual friends 200. Virtual friends 200 (also referred to as icons, friend icons, avatars, friend avatars, etc.) can also buy items in the playing area (e.g., food, etc.) and contribute to the economy of the playing area. This can be accomplished in a like or similar fashion to the well-known game entitled SIM-CITY. Each of the individual virtual friends carries on their business in the playing area independent of the other virtual friends 200. Thus, one (or more) of the virtual friends 200 may enter a particular casino and lose money while others may indulge in different activities (e.g., enter a cab, dine at a restaurant, shop at a store, etc.)

Each virtual friend of the virtual friends has their own identity. Each virtual friend's identity can be based on each virtual friend's respective friend information (taken from the real-world counterpart) which can comprise information such as their picture, name, occupation, money they have, money they have spent in the playing area, etc. Some or all of each virtual friend's identity can be displayed in an individual window 202 when the player clicks a virtual friend 201 (or mouse-over the virtual friend, etc.) Also displayed in each individual window are action buttons that when clicked, take particular actions for that individual (in FIG. 2 these action buttons are labeled as "invite", "gift", "chat", "collect", "postcard" although of course many other actions can be listed as well).

The invite button (when clicked) invites the real-world friend that is represented by the virtual friend 201. For example, displayed in the individual window 202 is the virtual friend's name ("Andy") which can correspond to a real person by that name in the social networking site that is a friend of the player. Thus, when the player clicks "invite" in the individual window 202, this would send out an invitation on the social networking site (e.g., a message on FACEBOOK) to the real "Andy" with a message inviting him to join the game and providing a link wherein when Andy clicks the link he can enroll in the game.

Other action buttons can comprise a "gift" button which, when pressed brings up a further window allowing the player to gift a real world gift to the real world Andy (e.g., a gift certificate for a free coffee, some FACEBOOK credits, etc.) Other gifts that the player can give a friend can be virtual goods such as credits, free spins, virtual items (e.g., a virtual outfit that can be worn by the player's avatar in the game), etc. A "chat" button can bring up a chat window which allows the player to chat (text chat or voice) with the real "Andy" (if the real Andy is available). A "postcard" button can take a picture of the current virtual city (e.g., from where the player is standing such as in front of a landmark) and send a postcard of the picture (with text attached such as the player's name) to a friend (either inside the game or outside the game such as via an email message with an image of the postcard attached). A "collect" button can be used by a player to collect gifts given to the player by the player's friends.

Thus, in this manner, the player's friends (some or all) on the social networking site (e.g., FACEBOOK or other) can all be found walking around the playing area as virtual friends. Virtual friends can take on the identity and characteristics of the real world friends of the player (the information of which can be gleaned from any data available on their profiles and other information accessible on the social network web site). If the player has 100 friends on the social networking site, all 100 friends can be imported into the playing area as described herein (using their real-world data) and can be found walking around (virtual friends) as described herein. This playing area may have more than 100 virtual friends (e.g., 1,000 virtual friends), in which the additional 900 virtual friends can have random or pre-stored characteristics and are not actually friends of the player.

Figure 3:
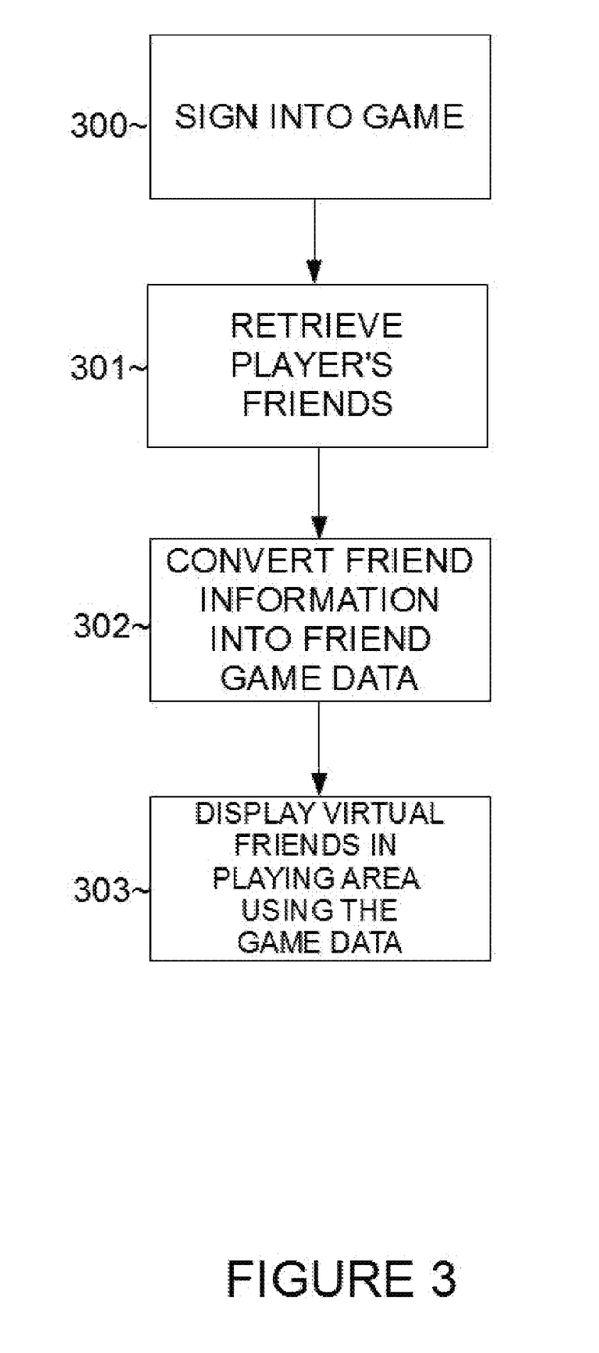
FIG. 3 is a flowchart of an exemplary method of importing a player's social graph into a playing area in a social networking game, according to an embodiment.

FIG. 3 is a flowchart of an exemplary method of importing a player's social graph into a playing area in a social networking game, according to an embodiment.

The method begins with operation 300, wherein a player signs into a game. The player would typically first sign into the social networking site (e.g., FACEBOOK) which serves as the platform for the game. Once signed into the social networking site, the player would then initiate the game itself (e.g., by clicking an icon or typing in the game name).

From operation 300, the method proceeds to operation 301, which retrieves the player's friends and also respective friend information. Social networking sites make available application programming interfaces so that application developers can program applications to retrieve particular data about the player (friend information), such as: profile data about the player (e.g., their occupation, place of work, education, sex, hobbies, marital status, and any other information that a user of a social networking site can enter about themselves), the player's friend list (names of players the player is friends with); profile data bout the player's friends, photos uploaded by the player, and any other information that is accessible about the player on the social networking site. Each real world friend of the player has their own profile (and other information) stored on the social networking site which is used to generate the respective friend information for that friend. The retrieval of the player's friends and friend information would actually retrieve data about the player's friends using a protocol compatible with the social networking site and the application programming interface.

In another embodiment, a player's friends as used are not retrieved from the player's own social networking sites (e.g., FACEBOOK) but instead can be populated using a number of other mechanisms. For example, the friends can be retrieved from the player's email or phone address back (which can be retrieved by the system). Or the system can use its own generic database of friends (or augment the player's own database with the generic database of friends). The generic database of friends can be chosen in real time to include a selected set of "friends" who appear in the game, such as famous movie stars, politicians, cartoon characters, etc.

From operation 301, the method proceeds to operation 302, which converts the friend information (retrieved in operation 301) to friend game data. Friend game data is data that is used in the actual game itself (in other words, the virtual counterpart to the real world information). If the friend information comprises a particular occupation (e.g., policeman), then the game data for that friend could include a two or three-dimensional model of a policeman that can be used to display the virtual friend. While operation 301 retrieves data (friend information) about the player's friends using the application programming interface on the social networking site, the friend information is converted into a different form that is then used by the game. For example, if the friend information is a sex of the player, then this would be used to identify an avatar to display the player of a compatible sex (e.g., if the friend is male then the virtual friend would be depicted using a male avatar (as opposed to a female avatar)). Thus, the friend information (sex) is converted to a game data (an identification of an avatar used to depict the friend). There can be many avatars (some male, some female) and the friends depicted in the game would each typically be assigned to an avatar (which should match the actual sex of that player). The sex of a friend is one type of friend information, but friend information can comprise any other characteristic about the friend that can be gleaned from the social networking site. Thus, many types of friend information are converted into game data which can then be used by the game.

Another example of game data is an occupation of a friend. If a friend is a doctor, then the virtual friend can be displayed in the game area as a doctor (e.g., wearing a doctor's uniform). The uniform an avatar is wearing would be the game data based on (converted from) the occupation of the friend (the friend information).

A further example of game data is a car (or other vehicle) of the friend. If the friend has a blue Mercedes, then the virtual friend can be displayed in the playing area driving a blue Mercedes.

Table I illustrates an example of friend information and the respective game data it can be converted into for that friend. For example, if a friend of the player has on his/her profile information that they own or have a hobby of a motorcycle, then that friend's avatar (virtual friend) in the playing world can be shown on a motorcycle. If the friend has a picture (e.g., their profile picture or other picture of the friend), this picture can be used to depict the virtual friend of the friend in the game. This can be done in two ways, either by digitally manipulating the picture (typically just a face shot) to appear on the face of the virtual friend (displayed in two or three dimensions), or when the virtual friend is selected by the player then more detailed information about the virtual friend can be displayed which can include the virtual friend's two-dimensional picture (which can be taken from the virtual friends real-world counterpart profile (or other) picture). Of course, the list in Table I is merely an example, and many other types of information gleaned from the player's friend's data available on the social networking site (e.g., their profile) can be used to translate that information into game data (which can be used to show how that friend is visually depicted in the playing world (the virtual friend) and also other uses).

Table I
Friend information game data
Sex=male choose a male avatar
Sex=female choose a female avatar
Occupation=policeman show policeman's uniform
Hobby=motorcycling show avatar on motorcycle
Picture show picture associated with avatar.

From operation 302, the method proceeds to operation 303, which displays the playing area (playing world) with the player's friends (virtual friends) integrated into the playing area with the display of each virtual friend visually depicted using its respective game data (e.g., the player's real-world friend "Andy" is a male and the virtual friend counterpart to the real world Andy is displayed using a male avatar).

Note that it is not required for a player's friends to be signed into the game for their respective virtual friend to be displayed in the player's playing world (e.g., walking around, etc.) For example, if Jack is currently playing the game and has a friend Jill on a social networking site (e.g., FACEBOOK) that is used to find friends to populate Jack's playing world, Jack can view Jill (a virtual friend, icon, avatar, etc.) walking around Jack's playing world. This is so even though Jill is not currently signed onto the game. Jill may or may not be currently signed into the game, her status of being signed in or not does not affect the ability for Jill's virtual avatar to appear in Jack's playing world or any other player's playing world. If Jill is currently signed into the game, then Jack and Jill are able to perform a live chat with each other in the player world. If Jill is currently not signed into the game, then Jack can send Jill a message but Jill would not be able to respond until Jill signs back into the game. Thus, a player's virtual friends are displayed in the two or three dimensional playing world even though they are not currently signed into the game. Each player would have their own corresponding virtual friend (also referred to as icon, avatar, etc.) that walks around in other players' (typically their friends') games (their playing world).

Some players are determined to be high value (valuable) players. For example a valuable player can be determined to be a player that has met some type of criteria, such as: spent at least a predetermined amount of cash in the game (monetized), reached a certain level in the game, completed a particular task in the game (e.g., constructed all or at least a certain number of buildings), invited a certain number of friends to the game, etc. When valuable players have a corresponding avatar (icon) walking around in the playing world (either in their game or another player's game such as a friend's playing world), the valuable player's avatar will be highlighted as compared to displayed icons of non-valuable players. Highlighted players can be brighter, larger, sparkle, glow, have nice or colorful outfits, etc., in order to highlight them. For example, Jack, Jill, and John are all players. Of the three, only Jill is a valuable player. When Jack plays and sees icons representing Jack, Jill, and John in the playing world, only Jill will be highlighted. When Jill plays and views the playing world and sees icons representing Jack and John, they both will not be highlighted (but if Jill's own icon is displayed it will be highlighted). Thus, players would strive to become valuable players so their corresponding icons that populate other peoples' games can "stand out" in the virtual playing world. Any number of virtual icons can be displayed in the playing world (e.g., 1 to 50 or more).

As described above, it is possible for a player of the social networking game to communicate with a friend on the social networking site via the friend's corresponding virtual friend in the social networking game. Such communications can be an invitation to the friend to join the game, a gift or message to the friend, or any other type of communication. Players can also chat with each other in two or three-dimensions. For example, the playing can also be used as a large chat room wherein players can type (or speak) messages to a recipient (identified by the speaker) or sent to all players visible on in the playing world.

As illustrated in FIG. 2, when a player highlights a virtual friend, buttons can appear which when pressed enable communication with the friend corresponding to the virtual friend. For example, if Andy is a real friend of the player on the social networking site, and Andy has a corresponding virtual friend in the social networking game, then the player can highlight the virtual Andy and click a button that says message which allows the player to type in a message (inside the social networking game) which then sends the message to the real world Andy on the social networking site (outside of the game). The message can be transmitted to the real Andy via a private message, wall posting, status update, email, etc.

In a further embodiment, players can be given virtual tasks in the virtual playing world. For example, a player's own avatar can be given a task in the virtual world (e.g., build a structure, etc.) When the player completes the task the player may be given some reward (e.g., more credits, loyalty points, a virtual gift, etc.) Players can be given a series of missions to complete in the virtual playing world.

Figure 4:
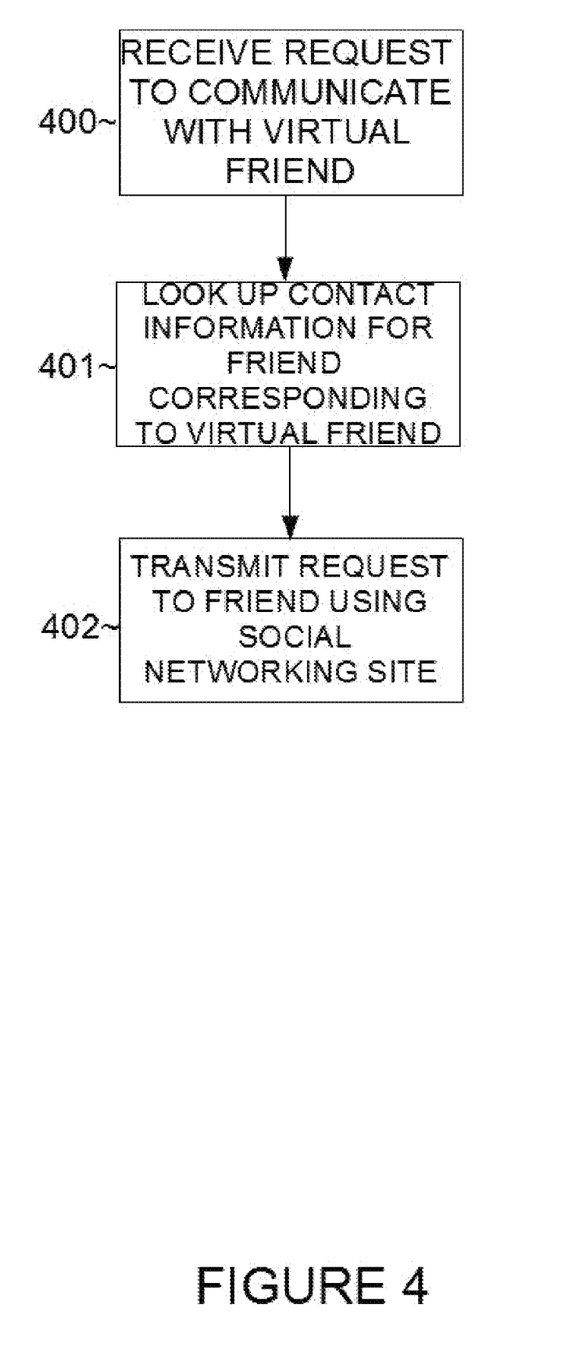
FIG. 4 is a flowchart of an exemplary method of contacting a virtual friend outside of the social networking game, according to an embodiment.

FIG. 4 is a flowchart of an exemplary method of contacting a virtual friend outside of the social networking game, according to an embodiment.

The method can begin with operation 400, which receives a request (inside the game) from the player to communicate with a virtual friend. This can be done as described herein, for example selecting the virtual friend in the game and clicking a respective button, link, or other part of the interface.

From operation 400, the method proceeds to operation 401, which looks up the contact information for the friend who corresponds to the virtual friend. Note that internal game communications are different from external game communications. An internal game communication is a communication from one player to another player which takes place inside the game (and is processed by the server hosting the game). In other words, the communication does not have to leave the game. An example of this type of communication is when one types a message to another player in the game which is only displayed in the game (the recipient has to be logged into the game to receive the message). An external game communication is a communication which is initiated inside the game but is delivered outside of the game (or vice-versa). For example, when a player wants to invite the real world counterpart of a virtual friend, the message (invite) can be initiated inside the game but would be delivered outside of the game because the friend is not signed up to the game yet (thus is considered an external message).

So in order to process an external message, the friend of the player that corresponds to the virtual friend needs to be identified (which can be stored in a table or other data structure) and the friend's contact information is retrieved (which can be identified from the social networking site). For example, to send a message on the social networking site to Andy (a user of the social networking site), the message would require contact information such as a unique identifier on the social networking site to uniquely identify Andy so a message can be transmitted to Andy. It is noted that users of social networking sites commonly have the same name and so the name of a user is typically not enough to address a message to.

Once the contact information is identified to communicate with the friend outside the game, then a request is sent to the social networking site to deliver a message to the friend using the friend's contact information. The social networking site should deliver the message to the friend outside of the game, in other words, the friend would not have to be logged into the social networking site in order to receive the message. The message can be delivered as a private message, status update, wall post, etc.

Thus, messages can be transmitted to a virtual friend in the game which can be delivered to the real world friend who corresponds to the virtual friend outside of the game (an external message). In additional to an invitation to play the game, such a message can be a gift (of virtual or real goods), a text message, a photograph of an image of what is taking place in the game (e.g., a screen shot), or any other type of message.

The game described herein can be hosted on one or more servers which are running in coordination with a separate set of servers hosting the social networking site.

Figure 5A:
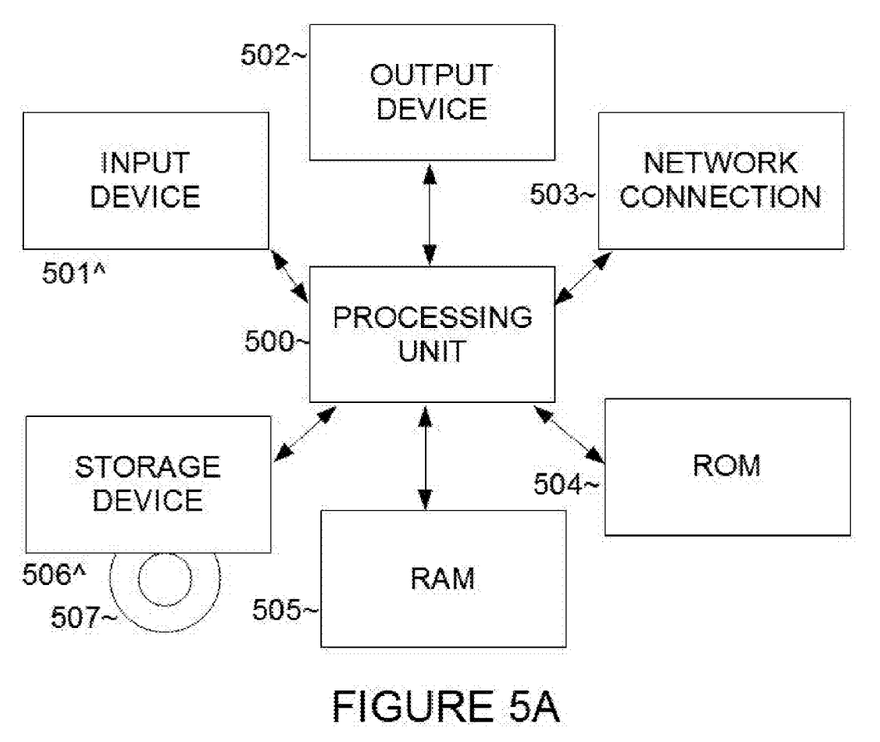
FIG. 5A is a block diagram illustrating exemplary hardware that can be used to implement the game described herein, according to an embodiment.

FIG. 5A is a block diagram illustrating exemplary hardware that can be used to implement the game described herein, according to an embodiment. The hardware in FIG. 5A can be used to implement a computer implementing the game described herein and/or a server that is serving the game to a computer which is displaying the game to a player. Such a server can interface with a social networking site (e.g., FACEBOOK, MYSPACE, etc.) that is used to coordinate the entire game and communicate with the players as well as a server used by the social network site.

A processing unit 500 can be a microprocessor and associated structure (e.g., bus, cache, clock, etc.) which can be connected to an input device (e.g., touch-screen, keyboard, mouse, buttons, etc.), and an output device (e.g., touch-screen, CRT, monitor, etc.) The processing unit 500 can also be connected to a network connection 503 which can connect to a computer communications network such as the Internet, Wi-Fi, LAN, WAN, etc. The processing unit 500 can also be connected to a ROM 504 and a RAM 505 as used in the art. The processing unit 500 can also be connected to a storage device 506 which can be nonvolatile storage device (e.g., BLU-RAY drive, CD-ROM drive, hard drive, EPROM, etc.) A computer readable medium 507 (e.g., BLU-RAY disc, CD-ROM, hard disc, etc.) can be read by the storage device 506 and can store programs and assets that can cause the processing unit 500 to perform any of the methods described herein. The ROM and RAM can also be loaded with instructions that can cause the processing unit 500 to perform any of the methods described herein.

Figure 5B:
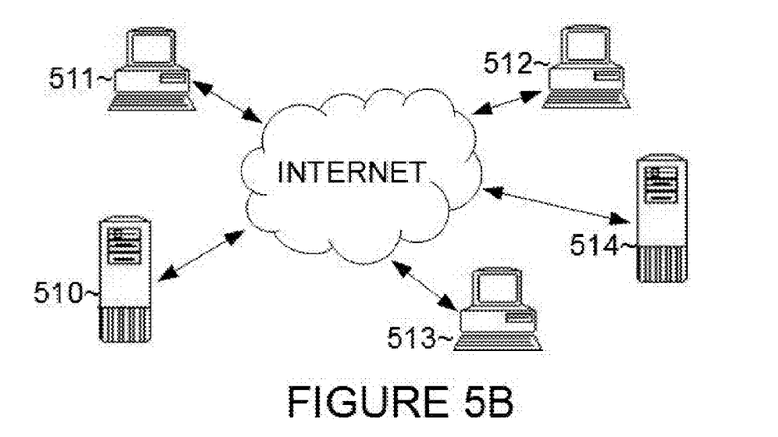
FIG. 5B is a network diagram showing a network structure for a social networking web site and players, according to an embodiment.

FIG. 5B is a network diagram showing a network structure for a social networking web site and players, according to an embodiment.

A computer communications network (such as the Internet) can be used to connect a host server 510 which can host and serve a social networking site. Note that while FIG. 5B shows only one server as the host server 510, the host server 510 can encompass numerous servers all cooperating with each other (whether in the same physical location or not). The host server 510 communicates with players 511, 512, 513 through the Internet (or other computer communication network) and can implement any of the methods herein by executing computer code programmed accordingly. Game server 514 can also implement all games and methods described herein on the site by executing computer code programmed accordingly. The game server 514 is connected to the Internet and can communicate with all of the players 511, 512, 513 directly or indirectly through the social networking site hosted by the host server 510. The game server 514 can cooperate with the host server 510 so that the games run on the game server 514 can be integrated into the social networking site hosted by the host server 510. The game server can also be optional and all of the games can be also hosted on the host server 510, whereby the integration of the games served/hosted by the game server 514 will appear embedded in the social networking site hosted by the host server 510 such that players would typically not realize (or care) that multiple servers are cooperating in order to play games on the social networking site. All of the communications described herein can be effectuated using such a network configuration. Typically, the communications are effectuated on the social networking site itself, thus the players 511, 512, 513 should be logged into the social networking site in order to participate herein, although logging in is not required (e.g., communications can be transmitted using other methods, such as email, IRC chat, instant message, etc.) The host server 510 can communicate with any of the devices illustrated in FIG. 1.

All components herein can be distributed across different such components as needed. For example, a single server as mentioned herein can be distributed across numerous different servers and locations. A processor (or processing unit) can also be distributed across multiple processors in a same or different computer (at a same or different location). The electronic components described herein represent an abstraction but it can be appreciated that the computer systems implementing the methods herein can be more numerous and interconnected than illustrated herein.

If a player is playing the game described herein on a social networking site or other type of hosted environment, then the player's computer would cooperate with the social networking server in order to present the game to the player. The player's computer would perform the instructions necessary to display the game while the remote server can determine the results (e.g., the final arrangement) and communicate this result via the Internet to the player's computer so that the player's computer can accurately display the result. The remote server may track and account for all credits wagered and won/lost while the player's computer can display the amount of credits owned or won at the direction of the remote server so the player cannot tamper with these amounts. All games described herein are considered to be played on the site described herein.

Any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a computer readable storage to control a computer. All features described herein (including all documents incorporated by reference) can be combined with one another without limitation. While the "credits" are used herein to refer to awards provided to players typically refers to non-cash value credits, this can also refer to cash credits as well (that are directly redeemable for cash).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to implement a game, the method comprising:
   providing a game server which cooperates with a host server which hosts and serves a social networking site, the game server connecting to a plurality of remote computers via Internet and executes computer readable instructions on an electronic processing unit which causes:
   enabling a player using a remote computer out of the plurality of remote computers to sign into a game associated with the social networking site;
   retrieving, from the social networking site, a friend of the player and the friend's respective friend information;
   displaying on the remote computer a game area depicted in two or three dimensions which comprises a virtual friend walking around the game area, the virtual friend having characteristics based on the friend information;
   displaying at least two virtual friends on the remote computer using avatars in the game area, and avatars of valuable virtual friends are highlighted that are determined to be representations of high value players while avatars of non-valuable virtual friends are not highlighted, wherein high value players are players which have met a criteria in the game;
   displaying on the remote computer a button alongside the virtual friend which allows the player to interact with the friend on the social networking site outside of the game;
   receiving a press of the button from the player using the remote computer; and
   in response to the press of the button, transmitting a message to the friend outside the game via the social networking site, wherein the friend has not signed up with the game and is not logged into the social networking site.

2. The method as recited in claim 1, wherein more than one of the player's friends is displayed as virtual friends in the game area, and each of the more than one of the player's virtual friends has characteristics of their real world counterparts based on their respective friend information.

3. The method as recited in claim 1, wherein the friend information comprises a sex of the friend and the virtual friend is displayed according to the sex of the friend.

4. The method as recited in claim 1, wherein the friend information comprises a hobby of the friend and the virtual friend is displayed using the hobby.

5. The method as recited in claim 1, wherein the friend information comprises an occupation of the friend and the virtual friend is displayed using the occupation.

6. The method as recited in claim 1, wherein the virtual friend is displayed using an image of the friend.

7. The method as recited in claim 1, wherein the friend information comprises a name of the friend which is displayed alongside the virtual friend.

8. The method as recited in claim 1, wherein the message comprises a gift from the player to the friend.

9. The method as recited in claim 1, wherein the criteria is that the high value players have spent a predetermined amount of money in the game.

10. The method as recited in claim 1, wherein the criteria is that the high value players have reached a predetermined level in the game.

11. An apparatus to implement a game, the apparatus comprising:
- a game server configured to cooperate with a host server configured to host and serve a social networking site, the game server configured to connect to a plurality of remote computers via Internet and execute computer readable instructions stored on a non-transitory computer readable storage medium programmed to:
- enable a player using a remote computer out of the plurality of remote computers to sign into a game associated with the social networking site;
- retrieve, from the social networking site, a friend of the player and the friend's respective friend information;
- display on the remote computer a game area depicted in two or three dimensions which comprises a virtual friend walking around the game area, the virtual friend having characteristics based on the friend information;
- display on the remote computer at least two virtual friends using avatars in the game area, and avatars of valuable virtual friends are highlighted that are determined to be representations of high value players while avatars of non-valuable virtual friends are not highlighted, wherein high value players are players which have met a criteria in the game;
- display on the remote computer a button alongside the virtual friend which allows the player to interact with the friend on the social networking site outside of the game,
- wherein the button is programmed such that upon being pressed from the player, a message is transmitted to the friend outside the game via the social networking site even though the friend has not signed up with the game and is not logged into the social networking site.

12. The apparatus as recited in claim 11, wherein the computer readable instructions are further programmed such that more than one of the player's friends is displayed as virtual friends in the game area, and each of the more than one of the player's virtual friends has characteristics of their real world counterparts based on their respective friend information.

13. The apparatus as recited in claim 11, wherein the computer readable instructions are further programmed such that the friend information comprises a sex of the friend and the virtual friend is displayed according to the sex of the friend.

14. The apparatus as recited in claim 11, wherein the computer readable instructions are further programmed such that the virtual friend is displayed using an image of the friend.

15. The apparatus as recited in claim 11, wherein the computer readable instructions are further programmed such that the friend information comprises a name of the friend which is displayed alongside the virtual friend.

16. The apparatus as recited in claim 11, wherein the computer readable instructions are further programmed such that the message comprises a gift from the player to the friend.

* * * * *